PHASE COMPARISON
DISCRIMINATOR
PHASE COMPARISON
DISCRIMINATOR
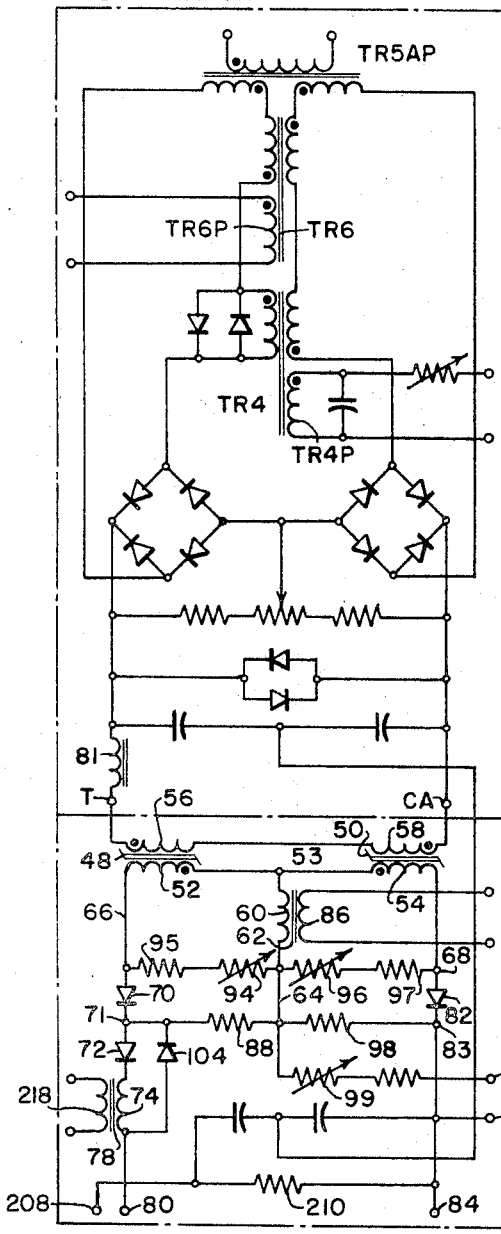
FIG. 2.
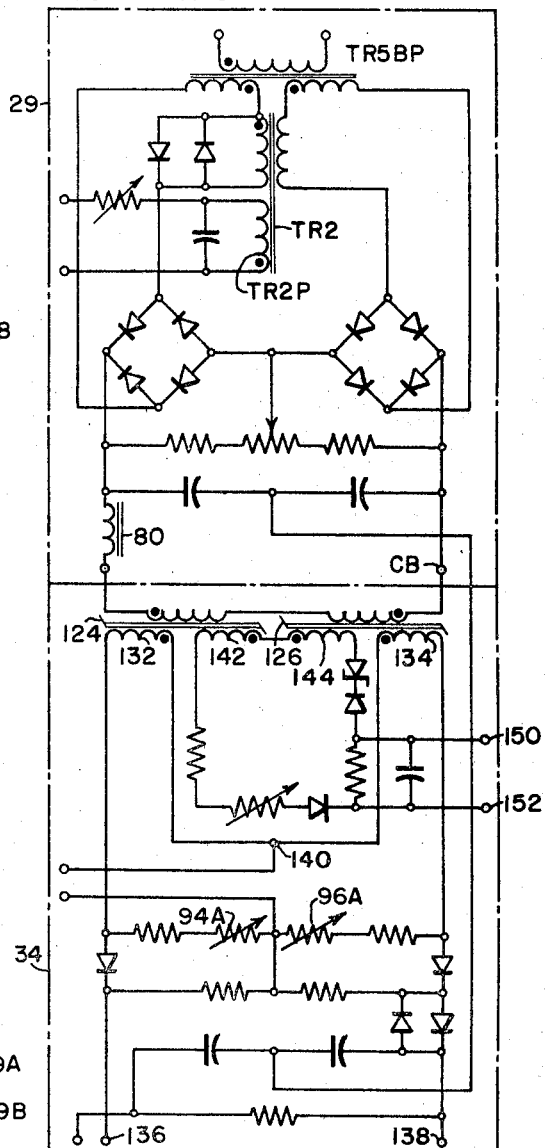
FIG. 3.   MAGNETIC AMPLIFIER
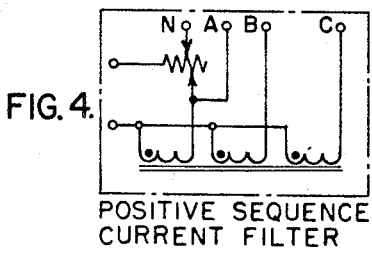
FIG. 4.
POSITIVE SEQUENCE
CURRENT FILTER
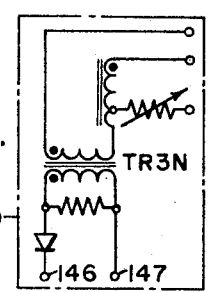
FIG. 5.
FEEDER NEGATIVE SEQUENCE
VOLTAGE FILTER

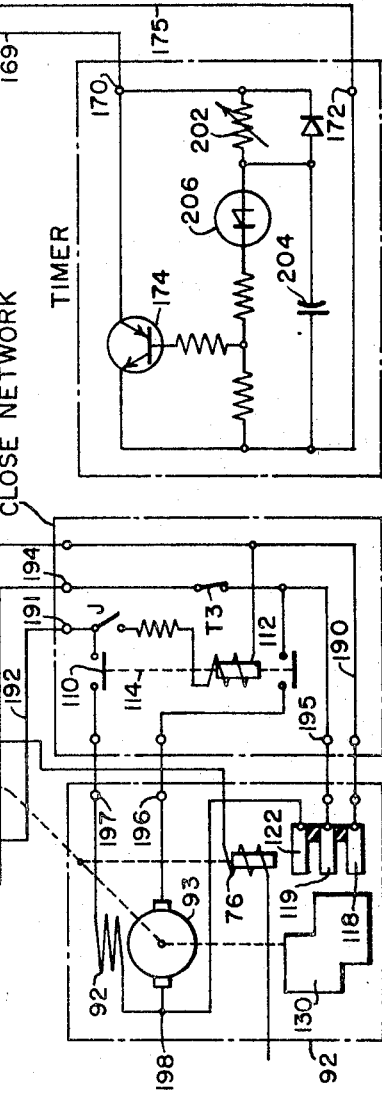
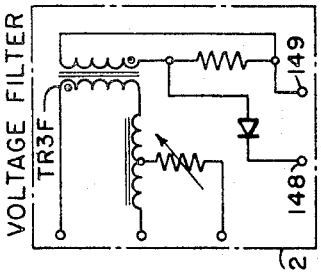
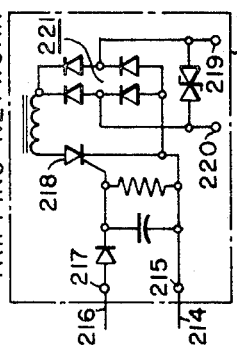
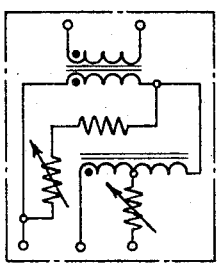
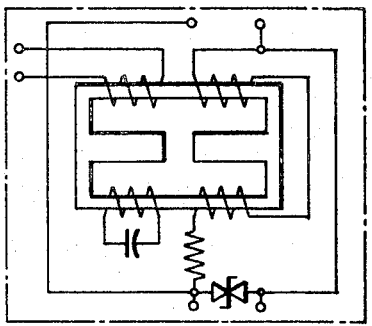

United States Patent Office 3,405,320
Patented Oct. 8, 1968

3,405,320
NETWORK PROTECTOR WITH STATIC
AND CIRCUIT
Paul J. Schwanenflugel, Glen Ridge, N.J., assignor to
Westinghouse Electric Corporation, Pittsburgh, Pa., a
corporation of Pennsylvania
Filed May 10, 1966, Ser. No. 548,989
15 Claims. (Cl. 317—27)

This application relates generally to relay apparatus and more particularly to such an apparatus known as a network protector.

Network protectors which operate to connect a feeder bus to a distributing network when the operating conditions of the feeder and network are such that upon closure of the connecting breaker the network will result in the flow of electrical energy from the feeder to the network. A typical prior art network protector of this general character is disclosed in my copending application Ser. No. 304,099, filed Aug. 23, 1963 now Patent No. 3,312,864 issued on Apr. 4, 1967. In that application, the output of the magnetic amplifiers is supplied through polar units to a series "AND" network which comprises essentially the mechanical contacts of the polar units which control the energization of the breaker trip coil and closing motor.

The present invention is directed to means for eliminating the mechanical contacts of the series AND circuit and substituting therefor a solid state static AND network.

It is an object of this invention to provide a network protector of the static type for operating a circuit breaker for connecting and disconnecting a feeder circuit to a power distributing network.

Another object of this invention is to provide a completely static network protector which is effective to close the circuit breaker to energize a completely deenergized distributing network.

Another object of this invention is to provide a static network protector which provides isolation between the load circuit and the relaying device which actuates the breaker.

Another object of this invention is to provide a static network protector in which the conductive condition of the static devices may be tested without actuation of the circuit breaker.

Other objects of this invention will be apparent from the description, the appended claims and the drawings, in which drawings:

FIGS. 2 through 10 are illustrative schematic circuits which may be utilized in the block diagram of FIG. 1.

Figure 1:
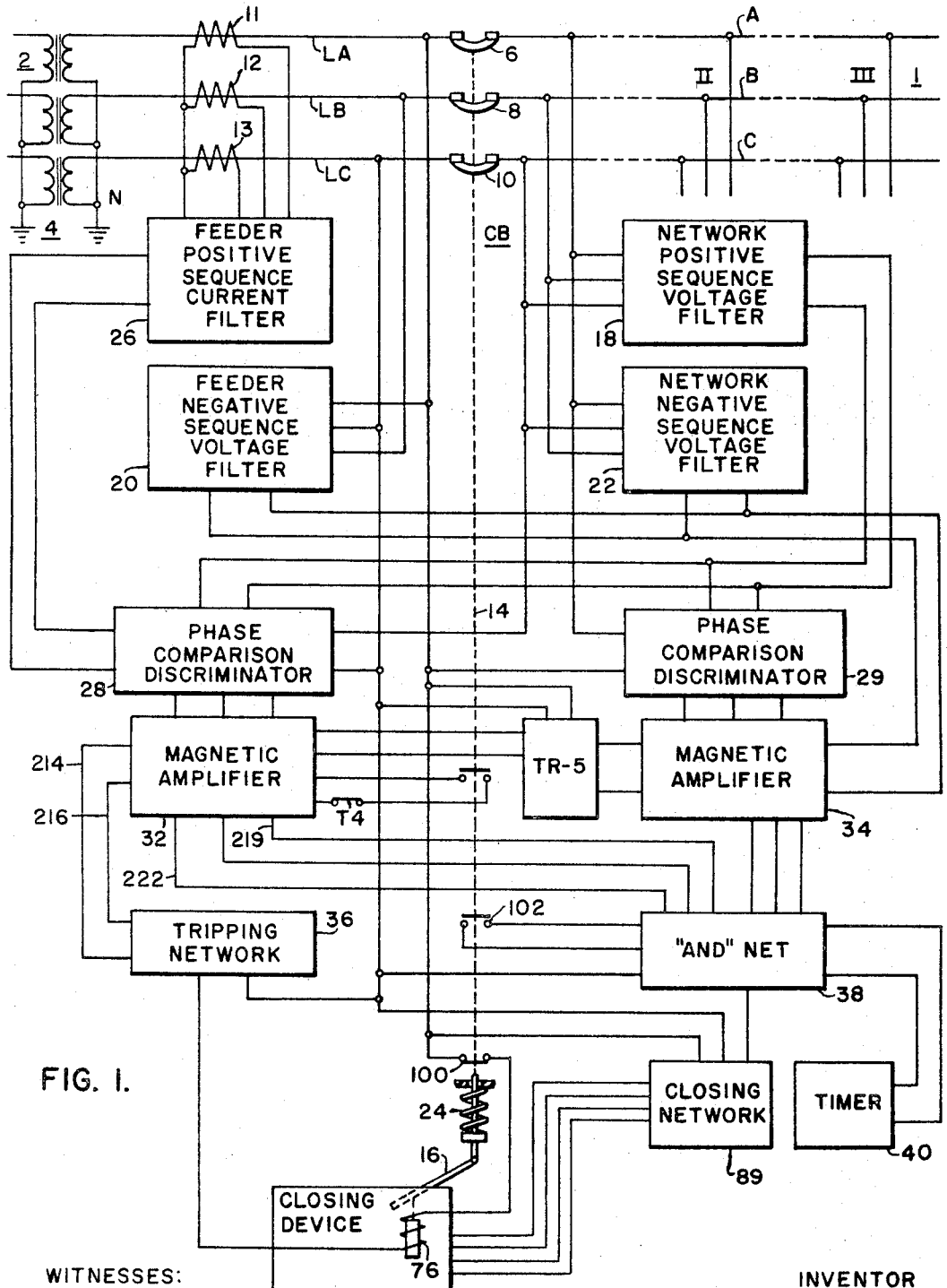
FIGURE 1 is a block diagram showing my invention.

Referring to the drawings by characters of reference and more particularly to FIG. 1, the numeral 1 indicates generally a portion of a secondary power distributing network having phase conductors A, B and C. The secondary power network may be in any conventional form such as a loop, a grid or a spot network.

Each of the plurality of spaced stations I, II and III is to be connected to a separate supply or feeder circuit through a network protector. Inasmuch as the stations are connected to their respective feeder circuit through similar network protectors it will suffice to illustrate and describe a connection of the station I to an associated feeder circuit 3.

It will be noted that feeder circuit 2 is connected to the network 1 through a network transformer 4 and the circuit controlling elements 6, 8 and 10 of a circuit breaker CB. The primary windings of the transformer 4 are illustrated as connected in delta for energization from the feeder circuit 2. The secondary windings of the transformer 4 are connected in Y or star with a grounded neutral N.

The circuit breaker CB is of conventional construction in which the circuit controlling elements 6, 8 and 10 respectively connect and disconnect the feeder lines LA, LB and LC to the network conductors A, B and C. The construction of the mechanical apparatus for opening and closing the elements 6, 8 and 10 of the circuit breaker CB may take any conventional form as for example that illustrated in FIG. 1 of Bruderly, U.S. Patent No. 3,213,322, dated Oct. 19, 1965. In the further discussion of Bruderly, the reference characters used herein are those of the patent as far as is convenient for the understanding of this application.

In accordance therewith the circuit breaker CB may having an actuating rod 14 which carries a pair of contacts 100 which are closed when the elements 6, 8 and 10 are in closed position to connect the feeder to the network and a pair of contacts 102 which are closed when the circuit elements 6, 8 and 10 are in open circuit position to disconnect the feeder line from the network line. The circuit breaker CB is illustrated in its closed circuit position and may be moved to open circuit position upon energization of a trip coil 76 which actuates suitable toggle mechanism as indicated in FIG. 1 of the Bruderly patent to permit the compression spring 24 to move the actuating rod 14 in a direction to cause the elements 6, 8 and 10 to interrupt the circuit connection between the feeder busses LA, LB and LC and the network busses A, B and C.

Closure of the circuit breaker CB is accomplished by a closing device 90 having a closing motor 92. The motor 92 comprises a field winding 91 and an armature 93. When energized, the armature 93 rotates and operates the link 30 which is operatively connected to the rod 14 thereby causing the elements 6, 8 and 10 to make circuit between the sets of busses. The motor 92 also drives a switch segment which cooperates with contact fingers 118, 119 and 122 to provide dynamic braking and locking circuits for the motor 92.

Currents dependent upon the current flowing in the feeder conductors LA, LB and LC are derived from current transformers 11, 12 and 13 which are associated respectively with the conductors LA, LB and LC and are located between the circuit breaker and the secondary windings of the feeder transformer 4.

Logic components are employed for performing the logic required to control the circuit breaker CB. These logic components are supplied with information in the form of single-phase voltages representing certain symmetrical components. For example, a network positive-sequence voltage filter 18 derives an input from the polyphase voltages present at the load terminals of the circuit breaker CB. This filter has a single-phase output proportional to the positive symmetrical component of the polyphase voltage present at the load terminals and in phase with the line A to neutral voltage of such polyphase voltage.

A feeder negative-sequence voltage filter 20 is energized in accordane with the polyphase voltage present at the supply terminals of the circuit breaker CB. This filter produces a single-phase voltage output which is proportional to the negative symmetrical component of the polyphase input voltage.

A network negative-sequence voltage filter 22 is energized in accordance with the polyphase voltage present at the load terminals of the circuit breaker CB. This filter produces a single-phase voltage which is proportional to the negative symmetrical component of the polyphase load voltage.

Information also is desired concerning currents flowing through the circuit breaker. This information is supplied by a positive-sequence current filter 26 which derives inputs from the three current transformers 11, 12 and 13.

The output of the filter 26 is a single-phase voltage proportional to the positive symmetrical component of the polyphase currents flowing through the busses LA, LB and LC and is referred to as the positive-sequence or the positive symmetrical component.

Finally, the phase comparison discriminating networks 28 and 29 provide output voltages for driving magnetic amplifiers 32 and 34. These amplifiers provide output quantities which are supplied to a tripping network 36 and an AND network 38.

The logic for effecting certain controls of the circuit breaker CB now will be considered. If the circuit breaker CB is closed the tripping of the circuit breaker is dependent on the outputs of the network positive-sequence voltage filter 18 and the feeder positive-sequence current filter 26. The outputs of the filters 18 and 26 are supplied to the phase comparison discriminator 28 which has an output dependent upon the direction of power flow through the circuit breaker CB.

In a preferred embodiment of the invention, the phase comparison discriminator 28 has a direct voltage output, the polarity of which indicates the direction of power flow through the circuit breaker CB. If the flow of power is from the feeder circuit 2 to the network 1 the polarity of the output of the discriminator 28 is in a non-tripping polarity and the circuit breaker CB remains closed. If the direction of power flow is from the network 1 to the feeder circuit 2, the polarity of the output of the discriminator 28 is a tripping polarity and the circuit breaker CB is tripped due to the energization of the tripping coil 76. Preferably, the sensitivity of the equipment is such that the flow of power from the network 1 to the transformer 4 in an amount sufficient to energize the transformer suffices to trip the circuit breaker CB. This assures tripping of the circuit breaker CB when the feeder circuit 2 is deenergized.

The output of the discriminator 28, if sufficient, could be applied directly to the circuit breaker CB for tripping the circuit breaker, however, in the preferred embodiment of the invention, the output of the discriminator 28 is amplified by a suitable amplifier 32 which desirably may be a magnetic or saturable reactor amplifier. The output of the magnetic amplifier 32 may be employed directly for tripping the circuit breaker CB but preferably it is supplied to a suitable tripping network 36 which, in turn, controls the energization of the trip coil 76 and the tripping of the circuit breaker CB. The tripping network 36 may take the form as indicated in FIG. 8.

If the circuit breaker CB is in tripped condition, the reclosure of the circuit breaker is controlled in part by the voltage which appears between network bus A and feeder bus LA. This voltage across the breaker element 6 is compared in the phase comparison discriminator 29 with the output quantity of the network sequence filter 18 and if the voltage relations are such that power will be supplied from the feeder circuit to the network 1 a direct voltage of suitable polarity will be supplied to the magnetic amplifier 34. The direct voltage output of the discriminator 29 if sufficient in magnitude, could be employed directly for energizing the closing of the circuit breaker CB. However, in the preferred embodiment of the invention, the output of the discriminator 29 is supplied to a suitable amplifier 34 which desirably may be a magnetic amplifier.

Similarly a reclosing quantity is derived from the phase comparison discriminator network 28 which is energized by a voltage quantity appearing between network bus C and feeder bus LC. This voltage across the breaker element 10 is compared with the output quantity of the network sequence filter 18. When the relations of these two quantities are such that power will be supplied from the feeder circuit to the network 1, a direct voltage will be supplied to the magnetic amplifier 32.

The outputs of the magnetic amplifiers 32 and 34 are applied to the AND network 38. If the input signals to the AND network 38 are of the proper polarity to provide an output signal, the timer 40 will time out and current will flow from the AND network 38 through the timer 40, and the now closed circuit breaker contacts 102 to the closing network 89 to energize the closing network relay 114 (FIG. 10).

Closure of the contacts 110 and 112 of the relay 114 energizes the motor 92 which thereupon commences to rotate. Rotation of the motor moves the switch segment 130 into contact with the contact fingers 118 and 119 whereby these fingers are connected together to establish a holding circuit for the relay 114 around the breaker contacts 102. The motor 92 continues to operate until the circuit breaker CB closes its elements 6, 8 and 10. As described in Bruderly, the segment 130 engages the contact finger 122 while still engaging the contact fingers 118 and 119 to dynamically brake the motor. This latter connection provides for full field excitation of the field 91 and for a short circuit of the armature 93. Subsequently, the segment 130 moves away from the finger 118, the relay 114 deenergizes, the motor is disconnected from the power source and it coasts to a position in which the segment is away from the fingers 119 and 122 as illustrated in FIG. 10.

When work is performed on the electrical system, it is possible that two phases of the network 1 or of the feeder circuit 2 may be interchanged. In order to prevent closure of the circuit breaker CB under these circumstances the outputs of the feeder and negative sequence voltage filters 20 and 22 are employed for preventing or restraining closure of the circuit breaker. Conveniently, this restraint may be introduced by suitably poled biasing potentials applied to the magnetic amplifier 34 which will prevent a critical signal from being supplied to the AND network 38 by the amplifier 34.

Under certain conditions, the voltages across the circuit breaker CB can produce a pumping action of the circuit breaker. When these circumstances are present, closure of the circuit breaker CB is prevented. An example of such an instance is in the event that the thyristors 42 and 44 should momentarily both become conducting due to transients or otherwise. The thyristors 42 and 44 may be and preferably are of the turn-off type. In this event, the thyristor 46 of the timing network 40 would be non-conducting and the relay 114 of the closing network could not become energized.

The positive and negative sequence voltage and current filters may take any usual form and for example may take the forms shown in FIGS. 4, 5, 6 and 7. These current filter networks are more completely described in my copending application Ser. No. 304,099. For the purposes of this application it is sufficient to note that the positive sequence current filter will energize the primary winding TR6P of transformer TR6 of the phase discriminator circuit (FIG. 2); the positive sequence voltage filter 18 will energize the primary windings TR5AP and TR5BP of the phase discriminator networks 28 and 29. The phase discriminator networks 28 and 29 are further provided with transformers TR4 and TR2, respectively, which have their primary windings TR4P and TR2P connected to be energized by the voltage appearing across the terminals which connect line LC to C and line LA to A respectively.

If the breaker CB is in its open position no signal will be provided by the positive-sequence current filter and the output signal of the phase comparison discriminator will be determined solely by the signals applied by the positive-sequence voltage filter and the relative polarities of the lines LA–A and LC—C. Assuming that the voltages of the feeder and the network are phased the same, the polarities of the output terminals CA–T and CB–O of the discriminators 28 and 29 will be polarized such that the CA and CB terminals will be positive with respect to their associated terminals T and O.

The magnetic amplifier 32 comprises a pair of saturation cores 48 and 50 having setting or gate windings 52 and 54 and control windings 56 and 58. The control windings 56 and 58 are connected in series between the output terminals T and CA of the discriminator 28 in opposite polarity. First like polarity or dotted terminals of the setting windings 52 and 54 are connected together to a terminal 53. This terminal 53 is connected to a bus 64 through the secondary winding 60 of a transformer 62. Second like polarity or undotted terminals of the windings 52 and 54 are connected to output busses 66 and 68 respectively. The bus 66 is connected through diodes 70 and 72 and the primary winding 74 of a trip controlling transformer 78 to one of the output terminals 80 of the amplifier 32. The other bus 68 is connected through a diode 82 to a second of the output terminals 84. The primary winding 86 of transformer 62 is arranged to be energized from a source of constant alternating potential TR–S, the details of which are illustrated in FIG. 9.

It is desired that the operating characteristics of the saturating core devices 48 and 50 are closely the same, however, any differences in these characteristics may be compensated for by varying the setting of the variable resistors 94 and 96. The variable resistor 94 is connected between the busses 64 and 66 in series with a fixed resistor 95 and the variable resistor 96 is connected between the busses 64 and 68 in series with a fixed resistor 97. Resistor 88 is connected between the bus 64 and a point 71 on the bus 66 which is intermediate the diodes 70 and 72. Similarly, a resistor 98 is connected between the bus 64 and a point 83 on the bus 68 which is intermediate the diode 82 and the output terminal 84.

During the half cycle of the transformer 62 in which the bus 64 is rendered positive with respect to the terminal 53 gating current will flow in parallel paths through the resistors 94–95 and winding 52 and the resistors 96–97 and winding 54. The resistors 94 and 96 are so adjusted (with normal current flow through the windings 56 and 58) that during the next half cycle in which the bus 64 is negative with respect to the terminal 53 the cores of the devices 48 and 50 will saturate at exactly the same instant in the output voltage wave of the transformer 62. This provides for equal and opposite voltages across the resistors 88 and 98 and no potential difference will appear across the output terminals 80 and 84.

With this setting of the resistors 94 and 96 any difference in the saturating time of the devices 48 and 50 will occur as a result of the energization of the control windings 56 and 58 under control of the discriminator network 28. Assuming a condition in which the output terminal CA of the discriminator 28 is positive with respect to its output terminal T, current will flow through the winding 58 from its dotted to its undotted terminal and through the winding 56 from its undotted to its dotted terminal. This current will unbalance the balance obtained between the devices 48 and 50 by the resistors 94 and 96 whereby the device 50 will saturate prior to the time of saturation of the device 48 at a time dependent upon the current magnitude through the windings 56 and 58.

With the device 50 saturated, more current will flow through the winding 54 than through the winding 52 and a greater potential will appear across resistor 98 than appears across resistor 88. Since the potentials across the resistors 98 and 88 are in opposition the output terminal 84 will be rendered positive with respect to the output terminal 80. Subsequently when the device 48 saturates more current will flow through the winding 52 and the potential drop across the resistor 88 will become substantially equal to that across the resistor 98. The unbalance in potential between the output terminals 80 and 84 will then disappear.

As will be explained below, this pulsing energization of the output terminals 80 and 84 will be utilized to fire thyristor 44 in the AND network 38. The resulting current flowing between the terminals 84 and 80 has substantially no effect on the transformer 78 because it flows through a diode 104 connected in shunt with the primary winding 74 and the diode 72.

The output of the phase discriminator 29 is connected across the control windings 106 and 108 of saturating core devices 124 and 126 which have their setting windings 132 and 134 connected between output terminals 136 and 138 and the common terminal 140 in substantially the same manner as described above in connection with the magnetic amplifier 32. With this arrangement the output terminal 138 will be rendered positive with respect to the output terminal 136 when the output terminal CB of the discriminator is positive with respect to its output terminal O. When its output terminal O is positive with the output terminal CB the output terminal 136 of the magnetic amplifier will be pulsed positively with respect to the output terminal 138 thereby preventing operation of the thyristor 42 of the AND network 38. The thyristor 42, therefore, can be rendered conducting solely at one relative polarity of the energization of the transformers TR5B and TR2. Thus polarity is obtained only when the phasing between the feeder busses LA, LB and LC and the network busses A, B and C is correct.

The saturating devices 124 and 126 are provided with second windings 142 and 144 respectively. These windings 142 and 144 are energized from the transformers TR3F and TR3N of the negative sequence voltage filters 20 and 22 respectively. These filter 20 and 22 sense the sequence of the voltage of the feeder and the network respectively.

The feeder and network negative sequence filters are illustrated in FIGS. 5 and 6 and are provided with output terminals 146, 147 and 148–149 respectively. The output circuits of these filters are connected in parallel to the input terminals 150 and 152 of the magnetic amplifier 34. If no negative sequence is present no quantities are supplied to the windings 142 and 144 and, if the voltage in the feeder is related to the voltage of the network such that upon closure of the circuit breaker CB energy will flow from the feeder into the network (the terminal CB being positive with respect to the terminal O) the device 126 will saturate prior to the device 124 and provide a conducting pulse for the thyristor 42 of the AND network 38. If, however, the busses of either the feeder or the network have been reconnected in an improper sequence, a negative sequence voltage will be supplied by either the feeder or the negative sequence voltage filter 20 or 22. One or both of the filters will energize the windings 142 and 144. These windings are polarized so that in the presence of this voltage, the device 124 will saturate prior to the device 126 whereby the output pulse of the amplifier 34 will positively pulse the terminal 136 relative to the terminal 138 and the thyristor 42 of AND circuit cannot become conducting.

The AND circuit 38, the timer 40, the closing network 89, and the closing motor device 92 are schematically shown in FIG. 10. Since the circuit breaker CB will never be called upon to close unless the feeder is energized, the energy for operating the AND circuit 38 and the closing motor 90 is derived from the feeder which in this case is the potential between the lines LA and LC.

A circuit may be traced from the line LC through the input terminal 154 of the AND circuit, a conductor 156, a diode 158, a reactor 160, the thyristor 42, a diode 162, the thyristor 44, a diode 164, and conductor 166 to output terminal 168. This circuit may further be traced from the output terminal 168 through a conductor 169, input terminal 170 of timer 40, a thyristor 174, the timer output terminal 172, a conductor 175, and terminal 176, to the switch terminal 178 of switch 180. When the switch 180 is in its center position, this circuit is further traced through a diode 186, a bus 184, the switch contacts 102 of the circuit breaker CB, a conductor 187, an output terminal 188 to an input terminal 189 of the closing network 89, a conductor 190, the operating winding of a relay 114 (having the normally open contacts 110 and 112) a current limiting resistor, a J switch, a terminal 191, and a conductor 192 to the feeder bus LA. The conductor 190 is also connected to the contact finger 118 of the closing device 90.

The closing network 89 is also provided with another terminal 194 which is connected by means of a conductor 193 to the feeder bus LC and which terminal 194 is connected by a conductor 195 to contact finger 119. The terminal 194 is also connected through coductor 195 and the normally open contacts 112 to one terminal 196 of the closing device 92. The terminal 191 is connected through the normally open relay contacts 110 to a second terminal 197 of the device 92. The device terminal 196 connects with one terminal of the motor armature 93. The other terminal 198 of the armature 93 is connected to one terminal of the field 91 and to the contact finger 122. The other terminal of the field 91 is connected to the terminal 197.

Assuimng that the J switch is closed and the circuit breaker CB is in its open circuit condition in which its contacts 102 are closed and a proper relationship between the feeder and network voltages, positive pulses will be applied at the output terminal 84–80 and 138–136 of the magnetic amplifiers 32 and 34. These pulses, as will be evident from FIG. 10, will render the thyristors 42 and 44 conducting. Thyristor 42 conducts to complete a circuit from the input terminal 154 through conductor 156, diode 158, reactor 160, diode 162, resistor 199, conductor 182, diode 186, contacts 102, conductors 187 and 190, winding of relay 114, J switch and conductor 192 to bus LA.

The magnitude of the resistance of resistor 199 is such that the current flow through the just-described circuit is insufficient to actuate the relay 114, but is sufficient to establish a holding current to maintain the thyristor 42 conducting and to establish a voltage across the thyristor 44. The thyristor 44 is rendered conducting by the positive pulse applied between its gate and cathode whereby it conducts to establish a circuit in shunt relation with the current limiting resistor 199. This circuit extends from its anode through its cathode, a diode 164 and a resistor 200 to the anode of the diode 186. The resulting current through the winding of the relay 114 is still insufficient to close the contacts 110 and 112, but conduction of the thyristor 44 does establish a voltage between the terminals 170 and 172 of the timer 40.

The establishment of this potential at the timer terminals starts its timing out due to a current to flow from the terminal through the variable resistor 202 and capacitor 204. The capacitor is charged at a rate dependent upon the setting of the resistor 202 and at the end of a predetermined time period the charge on the capacitor 204 will reach a critical charge and the breakover device 206 will breakover and current will flow through the gate-cathode circuit of the thyristor 174. The thyristor 174 thereupon conducts to establish a shunting circuit around the resistor 200. The current is now of sufficient magnitude to actuate the relay 114 to close its contacts 110 and 112.

Closure of the normally open contacts 110 and 112 establishes an energizing circuit for the motor 92 which extends from the bus LC through the terminal 194, contacts 112, the armature 93, the field 91 and the now closed contacts 110 to the bus LA. The motor 90 moves its switching segment 130 to connect the fingers 118 and 119 together to establish the above-described holding circuit therefore to insure a complete operation of the device 92. The motor 92 acts through linkage, not herein shown, but which is shown in U.S. Patent 3,213,322, to move the circuit breaker into a position in which its elements 6, 8 and 10 connect the feeder and the network conductors. This closing of the circuit breaker opens its contacts 102 and closes its contacts 100. The holding circuit for the winding of the relay 114 is opened when the circuit breaker CB is closed to deenergize the motor 92.

If the direction of power flow reverses and flows from the network to the feeder transformer 2, the signal provided by the positive sequence current filter reverses in relative polarity indicating that power is flowing from the feeder to the network. The potential derived from the transformer TR6 reverses and renders the output terminal T positive with respect to the output terminal CA. This reversal in polarity causes the device 48 to saturate prior to the device 50 with the result that the bus 66 will be positively pulsed with respect to the bus 68. This causes current to flow from the bus 66 through the diodes 70 and 72, the primary winding 74 of the transformer 78, the diode 164 of the AND circuit, terminal 208 of the amplifier 32, resistor 210, terminal 83, and resistor 98 to the bus 64. The potential appearing between the output terminals 80–84 is applied as a blocking bias to the thyristor 44 to positively hold this thyristor 44 non-conducting.

The secondary winding 218 of the transformer 78 is connected by conductors 214 and 216 to the input terminals 215 and 217 respectively, of the tripping network 36. When so energized the thyristor 218 fires to establish a tripping circuit through the tripping coil 76. This tripping coil circuit is energized from the feeder busses LC and LA through to input terminals 219 and 220 and full wave rectifier 221 of the tripping network 36. The terminal 219 connects directly to feeder bus LC and the terminal 220 is connected by conductor 222, the tripping coil 76 and the now closed contacts 100 to the feeder conductor LA. Energization of the tripping coil 76 operates as described in Patent 3,213,322 to trip open the circuit breaker CB.

The network protector may be calibrated or its calibration tested by operating the switch into its $T_1$ or $T_2$ positions and opening the switch $T_3$ in the closing network. If the apparatus is connected to the feeder and network busses as illustrated in FIG. 1 and these busses are known to be properly phased and the feeder busses are of a desired voltage magnitude greater than the network busses (1.5 volts is a satsifactory magnitude), the testing can be done without further apparatus if it is desired to calibrate the network protector when its is disconnected from the feeder and network busses, a test supply of three phase potential may be utilized which will provide a desired feeder bus potential and a desired network bus potential. This test supply may be applied to the network protector energizing conductors (those which are illustrated as being connected to the feeder and network busses).

When the switch 180 is in its $T_1$ position, the firing of the thyristor 42 may be calibrated. At this time the thyristor 44 and the timing thyristor 174 are shunted. The resistors 94A and 96A (FIG. 3) are adjusted with the circuit breaker CB open and a 1.5 volt $<0°$ closing voltage applied across the breaker CB. When the thyristor 42 is just rendered conducting the resistors 94A and 96A are properly adjusted. This may be observed by watching the turn-on of the lamp L1.

The thyristor 44 is similarly adjusted by placing the switch 180 in its $T_2$ position (in which the thyristors 42 and 174 are shunted). The resistors 94 and 96 (FIG. 2) are adjusted when the circuit breaker CB is closed and minimum trip current (from the network to the feeder) is flowing to cause the breaker CB to trip. Thereafter the resistor 99 is adjusted with a potential of for example .45 volt $<90°$ leading across the terminals 99A and 99B. When the lamp L2 just turns on the resistor 99 is properly adjusted.

Since numerous changes may be made in the above-described apparatus and different embodiments of the invention may be made without departing from the spirit thereof, it is intended that all matter contained in the foregoing description or shown in the accompanying drawings shall be interpreted as illustrative and not in a limiting sense.

What is claimed and is desired to be secured by United States Letters Patent is as follows:

1. In a protecting apparatus, a circuit breaker having polyphase supply terminals for connection to a source of polyphase energy and polyphase load terminals for connection to a polyphase load, said breaker including operating means for connecting said load terminals with said supply terminals, an actuating network connected to said operating means and effective in a first operating condition to cause said operating means to connect said load terminals to said supply terminals, said actuating network including first and second static switching devices, each said static device having a main circuit and a control circuit for actuating its associated said main circuit from a first to a second operating condition upon the application of a first signal thereto, said actuating network being placed in its said first condition solely when said static devices are each in their said second operating conditions, a first control network having an output circuit connected to said control circuit of said first static device and having first and second input circuits, first circuit means energized by a predetermined sequence of the voltage at said load terminals and connected to said first input circuit, said first circuit means being effective to supply a second signal in response to said predetermined sequence voltage at said load terminals, second circuit means energized by a voltage differential existing between the voltage at said load terminals and the voltage at said supply terminals and connected to said second input circuit, said second circuit means being operable to supply a third signal in response to a predetermined characteristic of said differential voltage, said first control network being effective to supply said first signal to its said output circuit when energized with said second and said third signals, a second control network having an output circuit connected to said control circuit of said second static device and having first and second input circuits, third circuit means energized by a desired sequence of the voltage at said load terminals and connected to said first input circuit of said second control network, said third circuit means being effective to supply a fourth signal in response to said desired sequence voltage at said load terminals, fourth circuit means energized by a voltage differential existing between the voltage at said load terminals and the voltage at said supply terminals and connected to said second input circuit of said second control network, said fourth circuit means being operable to supply a fifth signal in response to a predetermined characteristic of said differential voltage, said second control network being effective to supply said first signal to its said output circuit when energized with said fourth and said fifth signals.

2. The combination of claim 1 in which each of said control networks is provided with a third input circuit, a fifth circuit means energized by a voltage existing at said supply terminals and connected to said third input circuit of said first control network, said fifth circuit means being effective to supply a sixth signal, said first control network being effective to supply said first signal when energized with said second and said sixth signals, a sixth circuit means energized by a voltage existing at said supply terminals and connected to said third input circuit of said second control network, said sixth circuit means being effective to supply a seventh signal, said second control network being effective to supply said first signal when energized with said fourth and said seventh signals.

3. The combination of claim 1 in which said breaker includes operating means for disconnecting said load terminals from said supply terminals, said first control network is provided with a second output circuit and a third input circuit, a fifth circuit means energized by an undesired sequence of the current flowing between said load terminals and said supply terminals and connected to said third input circuit of said first control network, said fifth circuit means being effective to supply a sixth signal in response to said undesired sequence current, a second actuating network connected to said disconnecting operating means of said breaker and effective in a first condition to cause said disconnecting operating means to disconnect said load terminals from said supply terminals, said second actuating network including a third static switching device, said third device having a main circuit and a control circuit for actuating its associated said main circuit from a first to a second operating condition upon the application of a given signal thereto, said second actuating network being connected to said second output circuit of said first control network, said second actuating network being placed in its said first condition solely when said third static device is in its said second operating condition, said first control network being effective to supply said given signal to its said second output circuit when energized with said sixth signal.

4. A discriminating pulse producing network comprising first and second saturating devices, each said device having a core and a winding, a source of pulsating potential, first and second impedance devices, a static valve having a main path and a control circuit for initiating and interrupting current flow through said main path, a first series circuit comprising said winding of said first saturating device, said source and said first impedance, a second series circuit comprising said winding of said second saturating device, said source and said second impedance, each of said impedances having first terminals connected through a common connection to said source, each of said impedances having second terminals electrically spaced from said first terminals, first and second diodes, first and second output terminals, means connecting said first output terminal to one of said second terminals and including said first diode, means connecting said second output terminal to the other of said second terminals and including said second diode, both of said diodes being poled in the same direction with respect to the said second terminals with which they are associated, and means connecting said control circuit of said static valve between said output terminals.

5. The combination of claim 4 in which said cores of said saturating devices are proportioned relative to their respective said windings and to the magnitude and frequency of said source such that said cores will saturate within a half cycle period of said source, and in which there is provided means for altering the relative saturating time of said cores.

6. The combination of claim 5 in which said means for altering said saturating time are flux controlling windings on said cores and in which the magnitudes of said impedances are arranged to provide for saturation of one of said cores prior to the saturation of the other of said cores whereby one of said output terminals is pulsatingly energized with a positive potential relative to the other of said output terminals, said control circuit of said valve being connected to said output terminals in such polarity that said switch is actuated into its conductive condition when its said second control terminal is rendered positive with respect to its said first control terminal, and means operatively connected with said impedance which is in circuit with said one core and to said switch device, said operated means being actuated as a consequence of current flow through said switch to decrease the magnitude of said impedance which is in circuit with said one core.

7. The combination of claim 6 in which said static valve is of the semiconductor type, an electrical quantity sensing device connected between said output terminals, said sensing device having an output signal which is dependent upon the relative polarity of the potential between said output terminals, a second static valve of the semiconductor type, said second valve having a main path and a control circuit for controlling the initiation of conduction of its associated said main path, means connecting said operated means to said second valve for operation as a consequence of the conduction of its said main circuit, means connecting said sensing device to said control circuit of said second valve for rendering said main circuit of said second valve conducting in response to said output signal.

8. In a polyphase network protector having feeder terminals and network terminals and a power transferring circuit connecting said network terminals with said feeder terminals, said circuit including breaker means for making and breaking said circuit, a power direction determining network connected to said circuit and having an output connection energizable with an electrical quantity having its output characteristic variable with a reversal in the direction of power flow through said circuit, a pulse producing network having control input terminals and power input terminals and signal supplying terminals, said pulse producing network comprising first and second time delay circuits, each said delay circuit including a delaying element and an output element connected in series with each other across said power input terminals and effective to control the magnitude in the delay interval between the application of an energizing pulse to said power terminal and the energization of its said output element by said pulse, means connecting said delaying elements in reverse connection to said output connection of said direction determining network whereby a power flow through said transferring circuit in a first direction provides an increase in the delay provided by said delaying element of a first of said delay circuit and a power flow through said transferring circuit in a second direction provides an increase in the delay provided by said delaying element of the second of said delay circuits, means connecting said output elements in series opposition whereby the potential across said series connected output elements is the difference in the instantaneous potentials across said output elements.

9. The combination of claim 8 in which said delaying elements comprise magnetic amplifiers, each said amplifier having first and second windings, said first windings being connected between one of said power input terminals and the one of said output elements which is in the respective said pulse producing network, said second windings being connected in series across said output connection of said power direction determining network.

10. The combination of claim 9 in which each of said output elements comprises first and second resistors having first and second end terminals, each said output element including means connecting said first end terminals of its respective resistors to the other of said power input terminals, each said delay circuit including means connecting its said second end terminals of its said first and second resistors to said first winding of its respective said magnetic amplifier, said just-mentioned means including a diode connected between the respective said second end terminals of said second resistor and the respective said first winding, the magnitude of the resistance of said second resistors being less than that of said first resistors, said pulse producing network having output connections connected to each said second end terminals of said second resistors for energization by the difference in the instantaneous potentials of said second resistors.

11. The combination of claim 10 in which one of said delay circuits includes a third resistor and a switch connected in series circuit with each other, said last-named series circuit being connected in shunt with said first resistor of said one delay circuit, and control means connected to said output connections of said pulse producing network and to said just-mentioned switch, said just-named control means being operable when the output pulses of said pulse producing network are of a first polarity to actuate said just-mentioned switch to open the circuit therethrough, said first polarity being that polarity which results when said magnetic amplifier of said one delay circuit times out prior to the said magnetic amplifier of the other of said delay circuits.

12. The combination of claim 8 wherein there is provided first and second static current actuated control valves, each said valve having a power path and a control path, said control path being operable to initiate the flow of current through its respective said power path as a consequence of current flow therethrough in a first direction, said control path of said first valve being operable to terminate current through respective said power path as a consequence of the initiation of current flow through said control path of said first valve in a second direction, a translating device having an input connection and an output connection, means connecting said control path of said first valve to said output elements for response to said difference in instantaneous potential of said output elements and polarized to provide pulses of current in one of said directions when the time interval of said first delaying element is less than that of said second delaying element and pulses of current in the other of said directions when the time interval of said second delaying element is less than that of said first delaying element, means connecting said control path of said second valve to said output connection of said translating device and polarized such that curent flows in said first direction in said control path of said second valve concurrently with the flow of current in said second direction in said control path of said first valve.

13. The combination of claim 12 in which said translating device comprises a transformer, said input connections comprise a first winding, said output connections comprise a second winding, a first diode connected in series with said first winding, and a second diode connected in shunt with a circuit comprising said first diode and said first winding, said diodes being polarized to force current of one polarity to flow through said first winding and to prevent current of the other polarity from flowing through said first winding.

14. An electrical network comprising, an AND network comprising first and second and third static valve devices, each of said devices having a main circuit and a control circuit for initiating at least the initiation of conduction of its associated said main circuit, said AND network including means connecting said main circuit of said valve devices in series circuit, first and second magnetic amplifier networks, each said amplifier network having first and second input connections and an output connection, said output connections of said first and second amplifier connected to said control circuits of said first and second valve devices respectively, first and second discriminator networks, each of said discriminator networks having a first and a second input connection and an output connection, said output connections of said first and second discriminator networks being connected to said first input connections of said first and second amplifier networks respectively, a first source of alternating potential connected to said first input connection of said first and second discriminator networks, second and third sources of alternating potential connected to said second input connections of said first and second discriminator networks respectively, each of said discriminator networks including combining means interconnecting its said connections, said combining means combining the alternating input potentials supplied to its associated said input connections and supplying an alternating output potential to its associated said output connections, a fourth source of alternating potential connected to said second input connection of said first and second magnetic amplifiers, each said magnetic amplifier including a pair of saturable devices, each said saturable device including first and second setting means for setting its initial flux, said first setting means of said saturable devices being connected to said first input connections of the said amplifier network with which they are associated, each said magnetic amplifier further including a polarizing network connected to its said output connection and energized from its said second input connection, each said polarizing network of said amplifier including said second setting means of the said saturable devices associated with the same said amplifier with which said polarizing network is associated, each said polarizing network including means for individually adjusting the setting of said initial flux in its said saturable device provided by its said second setting means, said AND network including switch means having a first and a second operating condition, said switch means when in said first condition establishing a first shunting circuit around said main circuits of said second and said third valve devices, said switch means when in said second condition establishing a second shunting circuit around said first and said third valve devices, each said shunting circuit including current flow responsive means for responding to the conductive condition of the said circuit with which it is associated.

15. The combination of claim 14 in which a relay is connected to said series circuit, and in which the impedance of each of said shunting circuit reduces the current flow below the current required to energize said relay.

References Cited

UNITED STATES PATENTS

| | | | |
|---|---|---|---|
| 3,155,879 | 11/1964 | Casey et al. | 317—33 |
| 3,192,442 | 6/1965 | Warrenton et al. | 317—47 |
| 3,209,204 | 9/1965 | Rockefeller | 317—47 |
| 3,248,609 | 4/1966 | Gambale | 371—23 |
| 3,225,256 | 12/1965 | Carter et al | 317—28 |
| 3,312,864 | 4/1967 | Schwanenflugel | 317—23 |
| 3,312,866 | 4/1967 | Rockefeller | 317—28 |

LEE T. HIX, *Primary Examiner.*

R. V. LUPO, *Assistant Examiner.*